3,058,999
METHOD FOR THE PREPARATION OF 16-KETO STEROIDS
Max N. Huffman, Oklahoma City, Okla., assignor to Lasdon Foundation, Inc., Yonkers, N.Y., a corporation of Delaware
No Drawing. Filed Apr. 13, 1955, Ser. No. 501,210
6 Claims. (Cl. 260—397.4)

This invention relates to the manufacture of a series of polyhydrophenanthrene compounds having a functional keto or carbonyl group on the $C_{16}$ position and it is an object of this invention to produce a polyhydrophenanthrene compound having a keto or carbonyl group on the $C_{16}$ position and to provide a method for producing same.

More particularly, this invention relates to the manufacture of a steroid in which the $C_{17}$ position is free of a functional keto or hydroxy group and in which the keto or carbonyl group of the type ordinarily present on the $C_{17}$ position of the steroid is formed instead on the $C_{16}$ position and it is an object of this invention to produce and to provide a method for producing same.

Yet another object is to produce and to provide a method for producing estrogen and androgen compounds having a functional carbonyl grouping on the $C_{16}$ position as distinguished from the presence of the carbonyl group normally on the $C_{17}$ position of the corresponding steroid.

In my previously issued Patents No. 2,522,178, No. 2,542,773, and No. 2,522,177, description is made of a method for preparing a steroid having a keto or carbonyl group on the $C_{16}$ position while the keto or carbonyl group originally present on the $C_{17}$ position remains, as in 16-keto estrone, 16-keto equilin, 16-keto equilenin, or 16-keto dehydroandrosterone, and the like and the 3 esters thereof or in which the keto or carbonyl group originally present on the $C_{17}$ position is reduced to an hydroxy group as in 16-keto estradiol or its ether or ester derivatives and the like.

In every instance, the steroid having keto or carbonyl groupings on the $C_{17}$ position is reacted with isoamyl nitrite in a medium of tertiary butyl alcohol and potassium tertiary butoxide to produce the corresponding oximino steroid, as described by Litvan and Robinson in the "Journal of Chemical Society," p. 1997, published in 1938. In the manufacture of the 16,17-diketo steroid, the 16-oximino steroid is reacted with a bisulphite followed by hydrolyzing the intermediate with a mineral acid to yield the 16-keto steroid. In the preparation of the 16-keto-17-hydroxy steroid, the 16-oximino steroid is subjected to the Stodola reduction, Stodola, Kendall, and McKenzie, "Journal of Organic Chemistry" 6,841 (1941), by reaction with the zinc dust in the presence of an organic acid to provide a keto or carbonyl group on the $C_{16}$ position and to reduce the keto group on $C_{17}$ to an hydroxy group.

While the reaction through the 16-oximino steroid leads quickly and easily to the addition of a keto group on the $C_{16}$ position, the pathway represents only the start of a more difficult process for adding a keto or carbonyl group on $C_{16}$ while removing the functional group completely from the $C_{17}$ position of the steroid molecule.

Thus it is a further object of this invention to produce and to provide a method for producing 16-keto steroids free of functional hydroxy or keto groups on $C_{17}$ and to provide an economical method wherein such compounds can be prepared in a simple and efficient manner with high yield and it is a related object to produce new and improved steroid compounds formed in the manufacture of such 16-keto steroids including the 16-aromatic sulfonic acid esters of steroid compounds containing a functional hydroxy group.

More specifically, it is an object to produce such compounds as estrone-16, 5-androstene-3(B)ol-16-one and the 3 esters and ethers thereof.

In accordance with the practice of this invention, a 16-keto steroid free of a functional hydroxy group or keto group on $C_{17}$ is produced by nitrosation of the 17-keto steroid (I) in accordance with the teaching of Litvan and Robinson to produce the corresponding 16-oximino-17-keto steroid (II). The 16-oximino-17-keto steroid (II) is subjected to a Stodola reduction with zinc duct and acetic acid to convert the 16-oximino-17-keto steroid to the corresponding 16-keto-17-hydroxy steroid (III), as described in my aforementioned issued Patent No. 2,522,-177. The 16-keto-17-hydroxy steroid (III) is then converted to the corresponding 16-keto-17-aryl sulfonate (IV) by reaction of the 16-keto-17-hydroxy compound with an aryl sulfonyl chloride, such for example as p-toluene sulfonyl chloride or benzene sulfonyl chloride.

While the $C_{17}$ position is tied up as the aryl sulfonate, the keto group on the $C_{16}$ position is reduced to a hydroxy group (V) with a reducing agent such as sodium borohydride, lithium aluminum hydride, lithium borohydride and the like reducing agents.

Finally, the steroid is reacted with an alkali metal hydroxide, preferably in aqueous alcoholic medium, such as sodium or potassium hydroxide, to split out the aromatic sulfonic acid and produce the corresponding 16-keto steroid (VI) with the $C_{17}$ position free of any functional group.

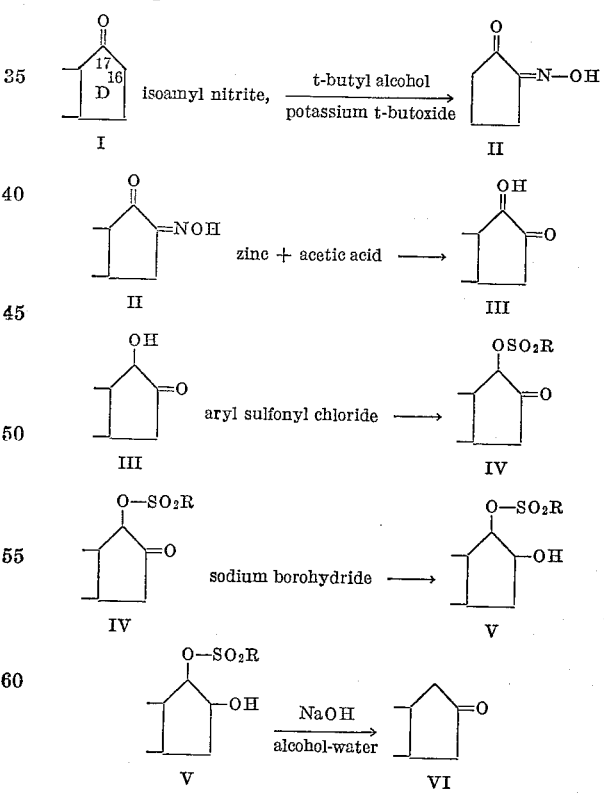

In accordance with the practice of this invention, the described procedure (IV→V→VI) for conversion of the steroid to produce a keto or carbonyl group on the $C_{16}$ position free of any functional group on $C_{17}$ can be carried out substantially independently of the construction of character of the remainder of the steroid nucleus including estrone, equilin, equilenin, isoequilin, and the like estrogenic compounds and isoandrosterone, dehydroisoandrosterone, androstenedione, androstanedione, amongst others of the androgenic steroids, and etiocholanolone amongst other etiocholane steroids.

When the $C_3$ position on the steroid molecule is previously occupied with an ester or an ether such as the methyl ester, methyl ether, ethyl ester, ethyl ether, benzyl ester, benzyl ether or the like lower aliphatic or aromatic esters or ethers, the aryl sulfonate forms by reaction with the hydroxy group present only on the $C_{17}$ position of the corresponding 16-keto-17-hydroxy steroid but the ester is also saponified off thereby to form the 3 hydroxyls or ethers of the 16-keto steroids by reaction with the alkali metal hydroxide. When, on the other hand, a hydroxy group is present on the $C_3$ position of the steroid, as when it is phenolic, reaction with the aryl sulfonyl chloride causes the sulfonate group to form substantially simultaneously on the $C_3$ and $C_{17}$ positions of the steroid molecule but a hydroxy group is reformed as by epimerization on the $C_3$ position while the aryl sulfonate is split off of the $C_{17}$ position upon reaction with the alkali metal hydroxide to form the corresponding 16-keto steroid. Instead of forming the 3 ethers and the like of the 16-keto steroid by occupation of the $C_3$ position with the corresponding ether group prior to reaction, the 3 esters or 3 ethers of the corresponding 16-keto steroid may be formed on the steroid subsequent to the formation of the 16-keto derivative by reaction of the 16-keto steroid with an etherifying agent as dimethyl sulfate, diethyl sulfate, dibenzyl sulfate or the like, or by reaction of the steroid-3-ol-16-one with acetic anhydride, benzoyl chloride, propionic anhydride, palmityl chloride, cyclopentylpropionyl chloride and the like to yield the corresponding acetate, benzoate, propionate, palmitate, cyclopentyl propionate esters and the like.

Thus by proper selection of the steroid base, 16-keto steroids having the following general structural formula may be produced

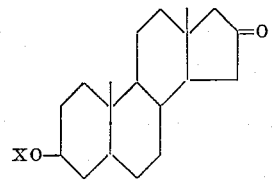

where X is hydrogen such as in estrone-16, equilin-16, equilenin-16, androstanolone-16, androstenolone-16, etiocholanolone-16 and the like or wherein X is R or OR' wherein R and R' are organic radicals of the type aliphatic, arylcyclic, aromatic, mixed aliphatic aromatic, or heterocyclic and derivatives thereof. When aliphatic, or mixed aliphatic aromatic, the aliphatic group may be branched or straight-chained, saturated or unsaturated, modified or unmodified. For example, R and R' may be methyl, ethyl, propyl, butyl, isoamyl, aryl, vinyl, cyclopentylpropyl, benzyl, tolyl, naphthyl and the like. Insofar as the rings are concerned, rings A, B and C may be saturated or unsaturated in which ring A may have three unsaturated groups as in estrone or in which both rings A and B may have three unsaturated groups as in equilenin, or in which ring A has three unsaturated groups while ring B has only two unsaturated groups as in equilin, or in which the groups are saturated as in androstan-3-ol-17-one or in which the groups are formed with an unsaturated group in the $\Delta^5$ position as in $\Delta^5$-androsten-3-ol-17-one or in which the groups are formed with an unsaturated group in the $\Delta^4$ position.

In order further to illustrate my invention, but without being limited thereto, the following examples are given:

*Example I*

About 5 parts by weight of 5-androsten-3(B), 17(B)-diol-16-one obtained by the zinc-acetic acid reduction of 16-oximino-5-androsten-3(B)-ol-17-one are dissolved in about 120 parts by weight of anhydrous pyridine and 18 parts by weight of p-toluenesulfonyl chloride added to the pyridine solution. The reaction mixture formed is allowed to stand at room temperature for about 24 hours in a sealed flask and the di-p-toluenesulfonate formed is separated by adding about 2500 parts by weight of ice water. After standing at about 7° C. for 12 hours the 5-androsten-3(B),17(B)-diol-16-one - di - (p-toluenesulfonate) which separates is filtered off, washed with water and dried at about 45° C.

The dried product is taken up in about 500 parts by weight of acetone and 225 parts by weight of water are added together with about 0.9 part by weight of concentrated sulfuric acid. The mixture formed is heated under reflux for about 4 hours and another 225 parts by weight of water are added. The mixture is now heated and the distillate is condensed and separated, the distillation being continued until the mixture becomes turbid. The latter is then cooled, 1100 parts by weight of ice water added and the mixture then maintained at about 7° C. for about 24 hours. The product separating is 5-androsten-3(B),17(B)-diol-16-one - 17-p - toluenesulfonate which is filtered off and dried at 40 to 50° C.

The latter is taken up in a hot solution of about 30 parts by weight of pyridine in about 140 parts by weight of methanol by refluxing. After the resulting solution is cooled to room temperature, a solution of 4.5 parts by weight of sodium borohydride in about 60 parts by weight of methanol is added and the reaction which takes place is allowed to proceed at room temperature for about 45 minutes. 500 parts by weight of water and 43 parts by weight of acetone are added and the whole thoroughly mixed. After standing for 15 minutes, 2000 parts by weight of ice water are added and about 33 parts by weight of concentrated hydrochloric acid are added. The solution is mixed, and cooled to about 7° C. for 12 hours. The 5-androsten-3(B),16(B),17(B) triol-17-p-toluenesulfonate which separates is filtered off. The latter is dissolved in about 1000 parts by weight of hot 95% ethanol under reflux and about 1300 parts by weight of 1.0 N aqueous potassium hydroxide are added slowly while the solution is refluxing. After the addition is complete, the solution is refluxed for one hour and is then distilled down to turbidity. The hot, turbid solution is filtered quickly through glass wool held in a heated funnel and the filtrate cooled and refrigerated for 24 hours. The crystalline product formed is filtered, washed with water and dissolved in about 50–55 parts by weight of methanol. The solution is treated with decolorizing charcoal and filtered through a sintered glass filter carrying a bed of diatomaceous earth. The filter bed and flask are washed with about 70 parts by weight of hot methanol, the liquid collected, and 50 parts by weight of water are added. The combined aqueous methanol filtrate and wash liquid is cooled at 7° C. for about 24 hours and crystals of 5-androsten-3(B)-ol-16-one are separated. The latter are recrystallized from a mixture of 72 parts by weight of methanol and 30 parts by weight of water and are obtained in the form of long needles which melt at 163.5 to 165° C. (unc.). The optical rotation is $[\alpha]_D^{22.5} = -242°$ in $CHCl_3$, as the hemihydrate.

*Example II*

3(B)-methoxy-5-androsten-17-one is converted to 16-oximino-3(B)-methoxy-5-androsten-17-one and the latter subjected to a zinc-acetic acid reduction to yield 3(B)-methoxy-5-androsten-17(B)-ol-16-one as described in Journal of Biological Chemistry, vol. 172, pages 791 et seq. (1948).

2.75 parts by weight of 3(B)-methoxy-5-androsten-17-(B)-ol-16-one are dissolved in about 80 parts by weight of anhydrous pyridine, cooled, and 9 parts by weight of p-toluenesulfonyl chloride added. The mixture is agitated until solution is complete and then allowed to stand at room temperature for about 24 hours. 1600 parts by weight of ice water are added and a precipitate of 3(B)-methoxy - 5 - androsten - 17(B) - ol - 16 - one - 17 - p - toluenesulfonate is separated and filtered off. The latter is dried at 40 to 50° C. and transferred to a reaction vessel with a hot solution of about 30 parts by weight of pyridine in 100 parts by weight of methanol. The mixture is refluxed until solution is complete, cooled to 30 to 40° C. and 3 parts by weight of sodium borohydride in about 60 parts by weight of methanol added. After agitation to ensure thorough mixing, the reaction mixture is held at room temperature for 45 minutes after which 400 parts by weight of ice water and about 32 parts by weight of acetone are added. The contents of the reaction vessel are mixed, allowed to stand for 15 minutes, and 1600 parts by weight of water and 33 parts by weight of concentrated hydrochloric acid are added. After mixing, and then cooling to about 7° C. for about 24 hours, the product, which is 3(B)-methoxy-5-androsten-16(B),17(B)-diol-17-p-toluenesulfonate, separates and is filtered off and washed with water.

The damp product is transferred to a reaction vessel with about 650 parts by weight of hot 95% ethyl alcohol and refluxed to complete solution. While refluxing is maintained, about 800 parts by weight of aqueous 1 N potassium hydroxide are added and reflux continued for one hour. The solution is then distilled until turbid and filtered hot. 500 parts by weight of water are added to the filtrate and the mixture cooled at 7° C. for 24 hours. Crude 3(B)-methoxy-5-androsten-16-one crystallizes out and is treated with decolorizing charcoal and recrystallized from a mixture of methanol and water. The recrystallized 3(B)-methoxy-5-androsten-16-one is obtained in the form of silky needles melting at 137.5 to 138° C. (unc.). The optical rotation is $[\alpha]_D^{21} = -252°$ in chloroform.

Example III 0.197 part by weight of 5-androsten-3(B)-ol-16-one are dissolved in about 2.5 parts by weight of dry pyridine and about 1.5 parts by weight of acetic anhydride are added. After thoroughly mixing and standing for 24 hours at about 20° C., about 1.5 parts by weight of acetic acid together with sufficient ice water are added to cause the product in solution to precipitate. After standing at a temperature of 20° C., the mixture is cooled to about 7° C. for about 24 hours. The precipitated acetate is filtered off, washed with water and dried under vacuum. The dry product is dissolved in methanol slightly acidified with acetic acid and then separated and recrystallized from aqueous methanol in the form of fine white needles which are filtered off, washed with water and dried under vacuum. The crystalline product is further purified by dissolving in acetone, treating with decolorizing carbon, and after the solution is filtered to remove the carbon, the acetone is evaporated off at steam bath temperature. The oil obtained is dissolved in about 3.5 parts by weight of 95% ethanol to which has been added 1.5 parts by weight of water slightly acidified with acetic acid. A crystalline precipitate is obtained after cooling under refrigeration and the crystalline precipitate is again recrystallized to effect further purification. The product obtained is 3(B)-acetoxy-5-androsten-16-one which crystallizes in the form of flat, waxy leaves which melt at 127.5 to 128° C. (unc.). A carbon and hydrogen analysis for $C_{21}H_{30}O_3$ is:

|  | Percent C | Percent H |
| --- | --- | --- |
| Calculated | 76.33 | 9.15 |
| Found | 76.41 | 9.18 |

Example IV 0.16 part by weight of 5-androsten-3(B)-ol-16-one are dissolved in about 4 parts by weight of dry pyridine and about 1.22 parts by weight of benzoyl chloride added. The mixture is agitated and held at 20° C. for about 17 hours after which it is diluted with sufficient water to bring the total mixture up to about 100 parts by weight and the dilute reaction mixture then left for about 24 hours at about 20° C. After being held at about 7° C. for 24 hours, the reddish oil which separates as the reaction product is separated, washed with water and dried under vacuum. The oil is dissolved in about 20 parts by weight of 95% ethanol containing a small amount of acetic acid and pyridine. The solution is reduced in volume by heating at about 100° C. and when cooled to room temperature, a white, flat, feathery needle-shaped crystalline precipitate is formed. The reaction mixture is refrigerated and the crystals then filtered off, washed with ice-cold aqueous ethanol and dried under vacuum. The crystalline product is dissolved in acetone treated with decolorizing carbon and the acetone solution filtered off and evaporated at 100° C. The residue is taken up in about 15 parts by weight of 95% ethanol, the solution cooled to room temperature and then refrigerated. The crystalline precipitate which forms is filtered off, washed with an ice-cold 4:1 mixture of 95% ethanol and water and placed in a dryer. The dry product is again recrystallized from 95% ethanol and the 3(B)-benzoxy-5-androsten-16-one separates in the form of broad, flat, needle-shaped crystals which melt at 224.5 to 225.5° C. (unc.). Analysis for $C_{26}H_{32}O_3$ is:

|  | Percent C | Percent H |
| --- | --- | --- |
| Calculated | 79.55 | 8.23 |
| Found | 79.54 | 8.40 |

Example V 0.149 part by weight of 5-androsten-(B)-ol-16-one are placed in a reaction vessel and 0.3 part by weight of crystalline sodium acetate and 0.15 part by weight of hydroxylamine hydrochloride are added together with about 11 parts by weight of 95% ethanol and 1.5 parts by weight of water. The mixture obtained is refluxed for about two hours at 90° C. and 30 parts by weight of water then added. The precipitate forming is dissolved on further heating. The mixture is then cooled to 20° C. and refrigerated. The crystalline product formed is filtered off, washed with water and dried. Further purification is effected by treatment with decolorizing carbon in methanol and the methanol filtrate reduced in volume and 10 parts by weight of water added. After slight heating the mixture becomes turbid and is cooled, filtered, washed with water and the product dried. Further purification is effected by recrystallization from aqueous methanol. The fine needle-shaped crystals are washed with water and dried. The 5-androsten-3(B)-ol-16-one oxime obtained melts at 204.5 to 205.5° C. (unc.). Analysis for $C_{19}H_{29}O_2N$ is:

Percent N
Calculated _____ 4.62
Found _____ 4.60

Following the same procedure, 5-androsten-3(B)-ol-16-one semicarbazone is obtained by reaction with semicarbazide. This novel compound melts at 232 to 235° C. with decomposition. A nitrogen analysis for $C_{20}H_{31}O_2N_3$ is:

Percent N
Calculated _____ 12.16
Found _____ 12.10

The reaction of 5-androsten-3(B)-ol-16-one with methoxylamine hydrochloride yields 5-androsten-3(B)-ol-16-one methoxime, which is obtained in the form of fine needles which melt at 137.5 to 138.5° C. (unc.). Analysis for $C_{20}H_{31}O_2N$ is:

Percent N
Calculated _____ 4.41
Found _____ 4.55

Example VI 1.85 parts by weight of 1,3,5(10)-estratrien-3,17(B)-diol-16-one obtained by the nitrosation of estrone benzoate (as described at J.A.C.S., vol. 66, pages 151 et seq., 1944) followed by the zinc-acetic acid reduction of the 16-oximino compound thus obtained (see Journal of Biological Chemistry, vol. 172, pages 326 et seq., 1948) are dissolved in about 50 parts by weight of anhydrous pyridine, the solution cooled and 8 parts by weight of p-toluenesulfonyl chloride are added. The mixture is agitated with cooling until solution is complete and held at ice bath temperature for about one hour. The mixture is then brought up to about 20° C. and mixed intermittently over the course of about 24 hours. About 1000 parts by weight of ice water are then added and a precipitate of 1,3,5(10) - estratrien - 3,17(B) - diol - 16-one-3,17-di-(p-toluenesulfonate) is obtained which is filtered off, washed with water and dried at about 40° C.

This product is transferred to a reaction vessel with about 80 parts by weight of hot methanol containing about 30 parts by weight of pyridine and the mixture is heated under reflux until solution is complete. After cooling the methanol-pyridine solution to about 40° C., a solution of 2 parts by weight of sodium borohydride in about 40 parts by weight of methanol is added and the reaction mixture agitated for about 45 minutes to complete the reduction. 300 parts by weight of ice water containing about 20 parts by weight of acetone are added, mixed thoroughly and the mixture allowed to stand for about 15 minutes. An additional 1200 parts by weight of ice water are added together with about 33 parts by weight of concentrated hydrochloric acid. After mixing thoroughly and cooling at about 7° C. for 12 hours, 1,3,5(10) - estratrien-3,16(B),17(B)-triol-3,17-di-(p-toluenesulfonate) obtained is filtered off and washed with water.

The damp product is transferred to a reaction vessel with about 220 parts by weight of hot 95% ethanol, and the mixture refluxed until solution is complete. About 135 parts by weight of 1 N aqueous potassium hydroxide is added and the mixture refluxed for 30 minutes until solution is again complete. A second addition of 135 parts by weight of aqueous 1 N potassium hydroxide is made and the mixture again refluxed for about 30 minutes after all the material present is in solution. The mixture is then distilled down until ebullition almost ceases, and 170 parts by weight of water are added after which the solution is permitted to stand at about 20° C. for 4 hours. The reaction mixture is filtered through a sintered glass filter and the filter then washed with 100 parts by weight of 0.1 N aqueous potassium hydroxide. The filtrate and wash liquor are combined and acidified with about 27 parts by weight of concentrated hydrochloric acid and the acidified solution held at 7° C. for about 12 hours. The crystalline product which separates is filtered, washed with water and then purified by treatment with decolorizing carbon in hot methanol. After further recrystallization from aqueous methanol, the 1,3,5(10)-estratrien-3-ol-16-one which is obtained separates in the form of feather-like crystals which melt at 243 to 244° C. (unc.).

Example VII 1.95 parts by weight of 3-methoxy-1,3,5(10)-estratrien-17(B)-ol-16-one-17-p-toluenesulfonate are dissolved in 72 parts by weight of absolute ether maintained under nitrogen and protected with calcium chloride, and 1 part by weight of powdered lithium aluminum hydride are added. The latter is rinsed into the liquid with an added 72 parts by weight of absolute ether and the resulting mixture heated under reflux for 3 hours. The lithium aluminum hydride complex formed is decomposed by the addition of 200 parts by weight of water, followed by a short refluxing. The reaction mixture is then transferred to a separatory vessel with the further addition of ether and extracted with 500 parts by weight of ice-cold 1 N aqueous sulfuric acid. The aqueous layer is separated and the ether layer washed with 500 parts by weight of 1 N aqueous sulfuric acid, again with 500 parts by weight of 1 N aqueous potassium hydroxide and finally washed twice with 250 parts by weight of cold water. The ether is evaporated off and the oily residue taken up in a mixture of absolute acetone and absolute alcohol. After reducing the volume of the solution, the oily residue is dried thoroughly and the yellowish oil remaining dissolved in a mixture of acetone and petroleum solvent (Skellysolve B). The solution is distilled down, with some further additions of petroleum solvent, until it becomes turbid and is then left to stand at about 20° C. A highly-colored oil separates out. After removal of the colored oil, the supernatant liquid remaining is rinsed with an additional quantity of petroleum solvent and then distilled down to a small volume and dried.

The initial highly-colored, oily fraction is dissolved in dry pyridine and then about 5 parts by weight of acetic anhydride are mixed in and the solution held at 20° C. for about 24 hours with occasional agitation. About 200 cc. of ice water are added to decompose the unreacted acetic anhydride and the cold mixture filtered, washed with water and the solid material remaining is dried. The latter is dissolved in absolute methanol under reflux and the solvent distilled off down to a volume of about 30 cc. On cooling to room temperature, tiny, white crystals are formed. The crystalline precipitate is filtered off, washed with ice-cold methanol and dried. After further recrystallization from absolute methanol 0.167 part by weight of 3-methoxy-1,3,5(10)-estratrien-16,17(B)-diol-16-acetate-17-p-toluene sulfonate are obtained melting at 160 to 161° C. Analysis for $C_{28}H_{34}O_6S$ is:

|  | Percent C | Percent H | Percent S |
| --- | --- | --- | --- |
| Calculated | 67.44 | 6.87 | 6.43 |
| Found | 67.42 | 6.80 | 6.33 |

Treatment of the second oily fraction obtained in a similar fashion yields 0.364 part by weight of the above compound, also melting at 160 to 161° C.

0.104 part by weight of the foregoing compound are mixed with about 17 parts by weight of ethyl alcohol and the steroid dissolved with gentle heating, about 20 parts by weight of 1 N aqueous potassium hydroxide added and the mixture refluxed for 30 minutes. 20 parts by weight of water are added and the resulting mixture then distilled down until it is turbid. After cooling, a crystalline precipitate forms. The latter is filtered off, washed with water and dried. After dissolving in methanol the solution of the steroid is treated with decolorizing charcoal, then filtered and about 10 parts by weight of water added to the methanol filtrate. On reducing the volume, crystallization takes place, the crystalline precipitate is filtered off, washed with water and dried. The crystalline product is again recrystallized from methanol and 0.048 part by weight of 3-methoxy-1,3,5(10)-estratrien-16-one are obtained melting at 124 to 125° C. Analysis for $C_{19}H_{24}O_2$ is:

|  | Percent C | Percent H |
| --- | --- | --- |
| Calculated | 80.24 | 8.51 |
| Found | 80.34 | 8.49 |

It will be understood that substitution of other steroid compounds can be made in the examples heretofore given for reaction of estrone and derivatives thereof and for reaction of dehydroandrosterone and derivatives thereof for similar reaction with the materials described to produce corresponding reaction products such the repetition here specifically to set forth each reaction will be repetitious and therefore will not be made for purposes of illustrating same.

When, as previously described, p-toluenesulfonyl chloride is used, the 17-tosylate is formed by reaction with the 16-keto-17-hydroxy steroid having an ester or ether group on the $C_3$ position and the corresponding ditosylate is formed when a hydroxy group is also present on the $C_3$ position of the steroid. Instead of p-toluenesulfonyl chloride, use may be made of other sulfonating agents, preferably aryl sulfonates such as benzyl sulfonyl chloride, naphthyl sulfonyl chloride and the like. While it is desirable to have an equivalent of the sulfonating agent available per hydroxy group on the steroid molecule for sulfonation, it is preferred to make use of the sulfonating agent in amounts in excess of that required for driving the reaction in the direction towards fullest utilization of the steroid.

Instead of sodium borohydride, lithium aluminum hydride, or lithium borohydride, use may be made of other reducing agents for conversion of the 16-keto group to the corresponding 16-hydroxy group in the steroid molecule, such as metal hydrides, and other similar reducing agents. For splitting off the sulfonate, it is preferred to make use of the alkali metal hydroxide in solution in a hot alcoholic aqueous medium by solution of the alkali metal hydroxide or other oxides in other neutral solvents may be employed. Instead of sodium hydroxide or potassium hydroxide, use may be made of other strong metal alkalies.

It is understood that the foregoing detailed description is given merely by way of illustration and that many variations may be made therein without departing from the spirit of my invention, especially as defined in the following claims.

I claim:

1. In the process for the production of a steroid of the esterogen and androgen series having a keto group on the $C_{16}$ position and a $C_{17}$ position free of a functional group selected from the group consisting of hydroxy and keto, the steps of reacting the 16 keto, 17 aryl sulfonate of the steroid with a reducing agent to form the corresponding 16 hydroxy, 17 aryl sulfonate, and then reacting the 16 hydroxy, 17 aryl sulfonate with an alkali metal hydroxide to split off the aryl sulfonate and convert the 16 hydroxy group to a keto group to form the corresponding 16 keto steroid.

2. In the process for the production of a steroid of the estrogen and androgen series having a keto group on the $C_{16}$ position and a $C_{17}$ position free of a functional group selected from the group consisting of hydroxy and keto, the steps of reacting a 16 keto, 17 hydroxy steroid with an aryl sulfonyl halide to form the corresponding 16 keto, 17 aryl sulfonate of the steroid, reacting the 16 keto, 17 aryl sulfonate with a reducing agent to produce the corresponding 16 hydroxy, 17 aryl sulfonate, and then reacting the 16 hydroxy, 17 aryl sulfonate with an alkali metal base to split off the aryl sulfonate and convert the hydroxy group to a keto group to form the corresponding 16 keto steroid.

3. The process as claimed in claim 2 in which the reducing agent is selected from the group consisting of lithium borohydride, sodium borohydride, lithium hydride, and lithium aluminum hydride.

4. The process as claimed in claim 2 in which the base compound is an alkali metal hydroxide in an aqueous alcoholic medium.

5. In the process for the production of a steroid of the estrogen and androgen series having a keto group on the $C_{14}$ position and a $C_{17}$ position free of a functional group selected from the group consisting of hydroxy and keto, the steps of reacting the 16 keto, 17 aryl sulfonate of the steroid with a metal hydride to form the corresponding 16 hydroxy, 17 aryl sulfonate, and then reacting the 16 hydroxy, 17 aryl sulfonate with an alkali metal hydroxide to split off the aryl sulfonate and convert the 16 hydroxy group to a keto group.

6. In the process for the production of a steroid of the estrogen and androgen series having a keto group on the $C_{16}$ position and a $C_{17}$ position free of a functional group selected from the group consisting of hydroxy and keto, the steps of reacting the 16 keto, 17 hydroxy steroid with an aryl sulfonyl halide to form the corresponding 16 keto, 17 aryl sulfonate, reacting the 16 keto, 17 aryl sulfonate with an alkali metal hydroxide reducing agent selected from the group consisting of lithium borohydride, sodium borohydride, lithium hydride and lithium aluminum hydride to form the corresponding 16 hydroxy, 17 aryl sulfonate, reacting the 16 hydroxy, 17 aryl sulfonate with an alkali metal base for splitting off the aryl sulfonate and converting the hydroxy group to a keto group.

References Cited in the file of this patent

UNITED STATES PATENTS

| 2,353,808 | Butenandt et al. | July 18, 1944 |
| 2,381,073 | Miescher et al. | Aug. 7, 1945 |
| 2,542,773 | Huffman | Feb. 20, 1951 |
| 2,584,271 | Huffman | Feb. 5, 1952 |
| 2,636,043 | Huffman | Apr. 21, 1953 |
| 2,752,371 | Fonken et al. | June 26, 1956 |
| 2,781,364 | Ziegler et al. | Feb. 12, 1957 |

OTHER REFERENCES

Fajkos et al.: Collection of Czechoslovakian Chemical Communication, May 15, 1954, pages 349–356.